United States Patent [19]

Monty, Jr.

[11] Patent Number: 4,607,580
[45] Date of Patent: Aug. 26, 1986

[54] CROP PLANTING MEANS

[75] Inventor: Charles Monty, Jr., Clarksdale, Miss.

[73] Assignee: Monty Planting Company, Inc., Clarksdale, Miss.

[21] Appl. No.: 702,956

[22] Filed: Feb. 19, 1985

[51] Int. Cl.⁴ ............................................. A01B 49/04
[52] U.S. Cl. ........................................ 111/1; 111/52;
111/73; 172/28; 172/112
[58] Field of Search .................... 111/1, 8–10,
111/52, 73, 77, 80, 85, 88; 47/1.42; 172/27, 28, 45, 47, 52, 63, 70, 112

[56] References Cited

U.S. PATENT DOCUMENTS

| | | | |
|---|---|---|---|
| 1,314,838 | 9/1919 | Wagner | 111/1 |
| 2,556,072 | 6/1951 | Dewey | 111/1 |
| 2,577,363 | 12/1951 | Poynor | 111/80 X |
| 3,128,729 | 4/1964 | Henson | 111/1 |
| 3,220,368 | 11/1965 | Gandrud | 111/73 X |
| 3,770,064 | 11/1973 | Scarnato et al. | 111/52 |
| 3,913,502 | 10/1975 | Richey | 111/1 |
| 4,078,626 | 3/1978 | Weichel | 111/1 X |
| 4,141,302 | 2/1979 | Morrison et al. | 111/85 |
| 4,324,295 | 4/1982 | Weichel | 111/1 X |
| 4,345,531 | 8/1982 | Redl | 111/1 |
| 4,359,100 | 11/1982 | Weichel | 111/1 X |
| 4,525,988 | 7/1985 | Harlan | 111/1 X |
| 4,552,079 | 11/1985 | Werner | 111/85 |

FOREIGN PATENT DOCUMENTS

| | | | |
|---|---|---|---|
| 401879 | 9/1924 | Fed. Rep. of Germany | 111/1 |
| 2506223 | 8/1976 | Fed. Rep. of Germany | 111/1 |

Primary Examiner—James R. Feyrer
Attorney, Agent, or Firm—Walker & McKenzie

[57] ABSTRACT

A second crop is planted in a field by first cutting and removing the majority of a first crop from the field, seeding the field with the second crop, and then immediately applying the cut portion of the first crop over the seeded field as a mulch. A planter including a cutting assembly and a row planting assembly is provided to accomplish the above steps in a single pass over the field.

1 Claim, 4 Drawing Figures

CROP PLANTING MEANS

BACKGROUND OF THE INVENTION

1. Field of the Invention

The present invention relates in general to agricultural means of and methods for planting a second crop behind a first crop or the like.

2. Description of the Prior Art

It is common in many areas of the world to plant a second agricultural crop such as soybeans behind a first agricultural crop such as wheat immediately following the harvesting of the first crop or the like. It is also known to cut the residue of the first crop into relatively small parts or shreds and to till or mix these cut portions of the first crop into the field or to use these cut portions of the first crop as a mulch over the field, etc. A flail-type cutting implement for performing this task is disclosed by Brady, U.S. Pat. No. 2,920,433. It is also common to plant the second crop utilizing no-till type planters such as disclosed by Moore, U.S. Pat. No. 3,611,956. Heretofore, if one desired to utilize the residue of the first crop as a mulch and to plant the second crop with a no-till type planter, the method consisted of first going over the field with a cutting implement such as disclosed by the above identified Brady patent and leaving the cut portions of the first crop on the surface of the field as a mulch, and then subsequently pulling a no-till type planter such as described by the above identified Moore patent over the field with the cut portion of the first crop lying thereon as a mulch. While such a method has certain advantages over the method of first tilling the residue of the first crop into the field prior to the no-till type planter being pulled thereover to plant the second crop, it does create certain problems relative to the accurate and positive placement of the planted seed of the second crop and any herbicide or the like to be applied due to the layer of mulch resting on the field.

A preliminary patentability search in class 111, subclasses 2, 6 and 7, and class 56, subclasses 12.7 and 504 revealed the following U.S. patents, in addition to the above identified Brady and Moore patents: Myers, U.S. Pat. No. 2,924,054; Henson, U.S. Pat. No. 3,128,729; Cox. U.S. Pat. No. 3,367,293; Sylvester, U.S. Pat. No. 4,191,262; and Mellinger, U.S. Pat. No. 4,241,674. None of the above patents disclose or suggest the present invention.

SUMMARY OF THE INVENTION

The present invention is directed toward providing an improved means of and method for planting a second crop behind a first crop. The concept of the present invention is to plant the second crop while the majority of the residue of the first crop is temporarily removed from the field.

The method of the present invention comprises, in general, the steps of removing the majority of the first crop from the field; planting the second crop in the field after the majority of the first crop has been removed from the field; and placing the removed portion of the first crop back onto the field as a mulch after the second crop has been planted in the field. The means of the present invention includes, in general, cutting means for cutting and removing the majority of the first crop from the field; and planting means located behind the cutting means for planting the second crop after the cutting means cuts and removes the majority of the first crop from the field; the cutting means including discharge means for directing the cut portion of the first crop upward and over the planting means and for allowing the second crop to be planted with the majority of the first crop removed from the field and to subsequently allow the cut portion of the first crop to fall back onto the field over the planted second crop to act as a mulch.

One objective of the present invention is to provide a more efficient device and process for the practice of no-till farming of a second crop such as soybeans behind a first crop such as wheat. A principal objective of the present invention is to remove the majority (approximately 60%) of the residue of the first crop (i.e., wheat straw) from the soil to facilitate accurate placement of the planted seed of the second crop, permit the positive placement of herbicide directly to the soil, and to place the residue of the first crop over the newly planted seed of the second crop and the herbicide in a mulch arrangement. Advantages offered by the present invention over existing no-till planters include: (a) complete coverage of seed in the soil, which is not always possible with existing no-till planters since they have to cope with standing and cut residue of the first crop left by the combining operation of the first crop; (b) the moisture that is trapped and held by the mulch increases the percentage of seed germination of the second crop; and (c) the increased moisture trapped and held by the mulch tends to make the herbicides more active since moisture is required for their activation.

DESCRIPTION OF THE PREFERRED EMBODIMENT

Figure 2:
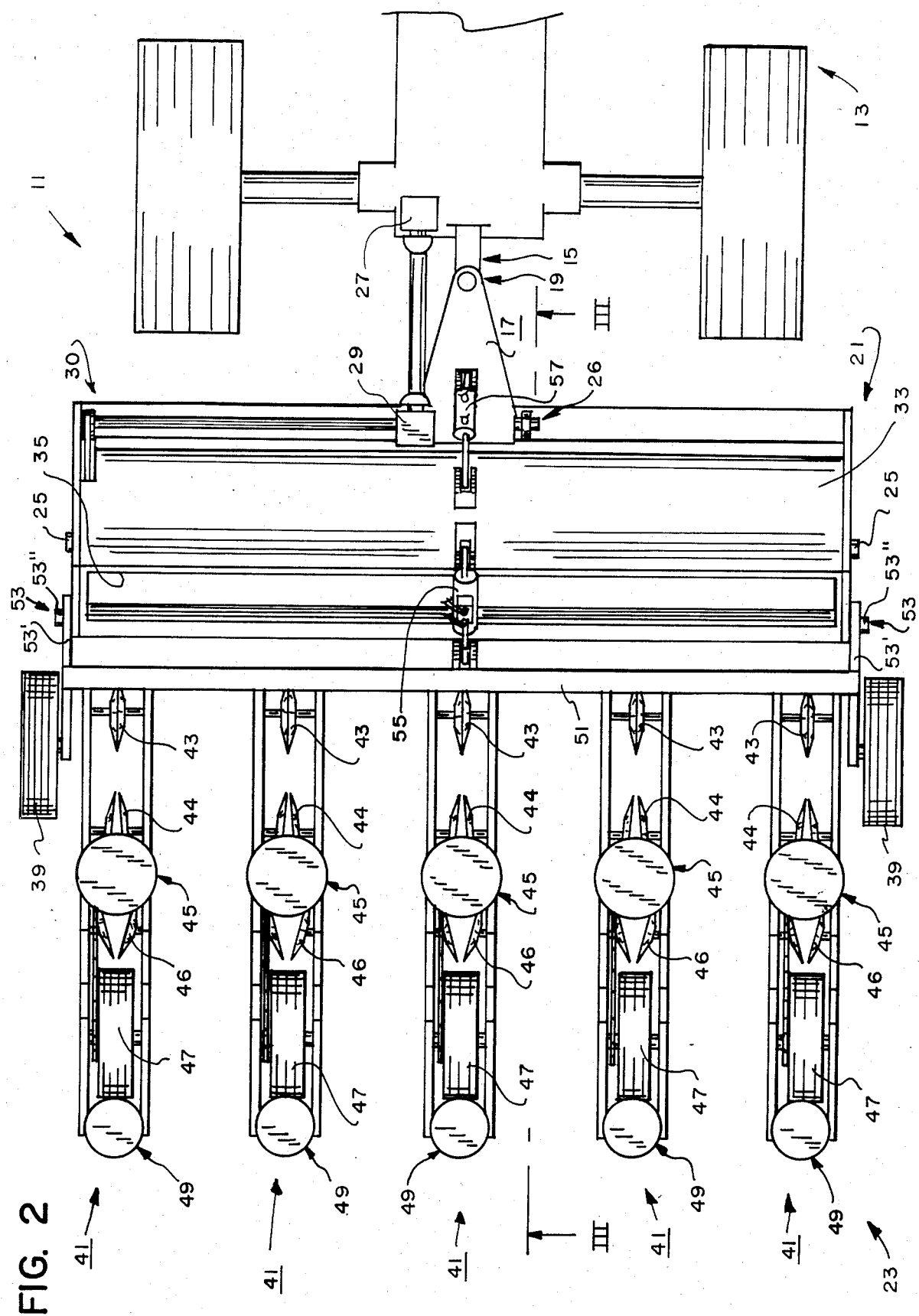
FIG. 2 is a top plan view of FIG. 1.

The preferred embodiment of the planter of the present invention is intended for being mounted to a typical agricultural tractor 13 or the like by way of a drawbar 15 having a towing bracket 17 at its forward end for being pivotally coupled to the tow hitch 19 of the tractor 13 (see, in general, FIG. 2). Thus, the planter 11 can be pulled over a field by the tractor 13 to plant a second crop in the field having at least a portion of a first crop thereon (i.e., having at least the residue or remains of the first crop after the first crop has been harvested).

Figure 1:
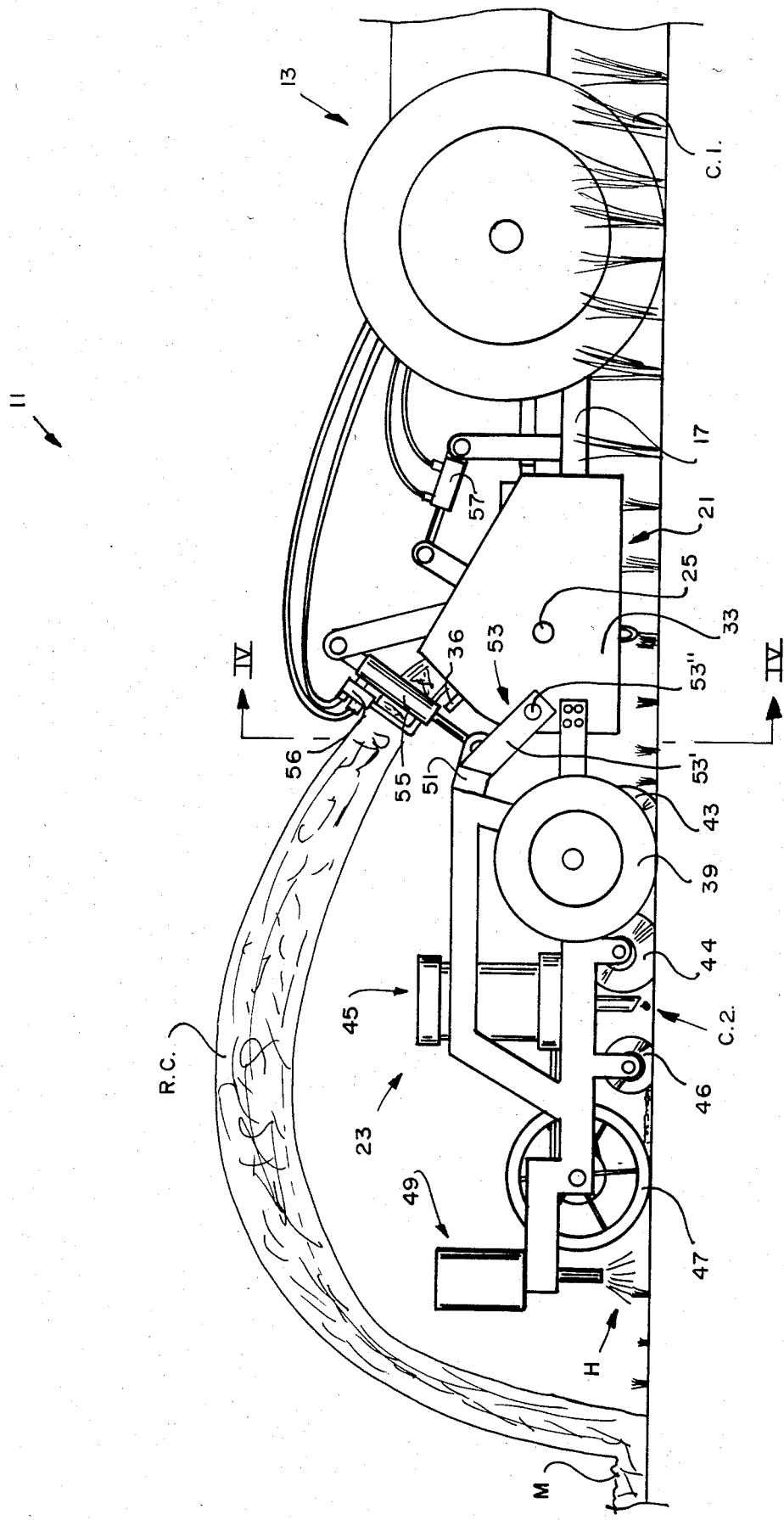
FIG. 1 is a side elevational view of the planter of the present invention shown attached to a tractor.

The planter 11 includes a cutting means 21 for cutting and removing the majority of the first crop from the field; and a planting means 23 located behind the cutting means 21 for planting the second crop after the cutting means 21 cuts and removes the majority of the first crop from the field. The cutting means 21 includes discharge means for directing the cut portion of the first crop upward and over the planting means 23 and for allowing the second crop to be planted with the majority of the first crop removed from the field and to subsequently allow the cut portion of the first crop to fall onto the field over the planted second crop to act as a mulch. FIG. 1 diagrammatically shows the uncut portion of the first crop as at C.1, shows the cut and removed portion of the first crop as at RC being blown or thrown over the planting means 23, shows the second crop being planted as seeds as at C.2 while the removed portion of the first crop is in the air, shows a herbicide as at H being applied to the ground after the second crop has been planted and while the removed portion of the first crop is in the air, and shows the removed portion of the first crop falling back onto the ground as a mulch as at M after the second crop has been planted and the herbicide applied.

The towing bracket 17 may consist of an A-frame type structure coupled directly to the cutting means 21 (see, in general, FIG. 2) and, in essence, forms an integral part of the cutting means 21 to allow the cutting means 21 to be pulled directly behind the tractor 13. The cutting means 21 includes an elongated shaft member 25 rotatably supported relative to the drawbar 15 and arranged substantially transversely of the direction of travel of the tractor 13. The cutting means 21 is preferably pivotally attached to the drawbar 15 to allow relative vertical movement of the cutting means 21 with respect to the ground to allow the cutting height of the cutting means 21 to be varied. The pivotal connection may be of various specific construction as will now be apparent to those skilled in the art such as a typical pivot rod-ear assembly as shown at 26 in FIGS. 2 and 3. The shaft member 25 is rotatably driven in any manner apparent to those skilled in the art. Preferably, the tractor 13 is provided with the typical power take-off drive 27 and the cutting means 21 includes a drive transfer means for coupling the shaft member 25 to the power take-off drive 27 of the tractor 13 and for causing the shaft member 25 to be rotatably driven by the power take-off drive 27. The drive transfer means preferably includes a speed increasing transmission means 29 of any typical construction and a chain drive means 30 for transferring rotational movement to the shaft member 25. The cutting means 21 preferably includes a plurality of blade members 31 attached to the shaft member 25 for rotation therewith and for cutting the majority of the first crop as the planter 11 is moved thereover. The cutting means 21 also preferably includes a hood member 33 for covering the shaft member 25 and the cutting blade members 31. The hood member 33 preferably has an elongated discharge opening 35 therethrough extending substantially the entire length of the shaft member 25 and located generally at the upper rear corner of the hood member 33. The hood member 33 may be provided with an outwardly extending lip 36 located conterminous with the lower side of the discharge opening 35 to aid in directing the cut portion of the first crop upward and over the planting means 23 (see FIGS. 1 and 3). The hood member 33 preferably has an inner face surface 37 for coacting with the cutting blade members 31 to cut the majority of the first crop as the planter 11 is moved thereover and to cause the cut portion of the first crop to be discharged from the hood member 33 through the discharge opening 35, the discharge opening 35, lip 36 and inner face surface 37 coacting to define the discharge means. The cutting means 21 preferably includes wheel means 39 for rollably engaging the field and for providing support to the planter 11. The specific type and member of wheel means 39 may vary as will be apparent to those skilled in the art. Thus, for example, the cutting means 21 may include four spaced apart wheel means 39. Thus, cutting means 21 may consist generally of a typical flail-type cutting implement such as disclosed by Brady, U.S. Pat. No. 2,920,433 with certain critical modifications thereto including the speed increasing transmission means 29 for increasing the speed (revolutions per minute) of the shaft member 25 and blade members 31 to approximately twice that needed for normal cutting with such flail-type cutting implements, and including the location of the discharge opening 35 and lip 36 generally at the upper rear corner of the hood member 33 for coacting with the inner face surface 37 of the hood member 33 to define the discharge means for directing the cut portion of the first crop upward and over the planting means 23.

Figure 3:
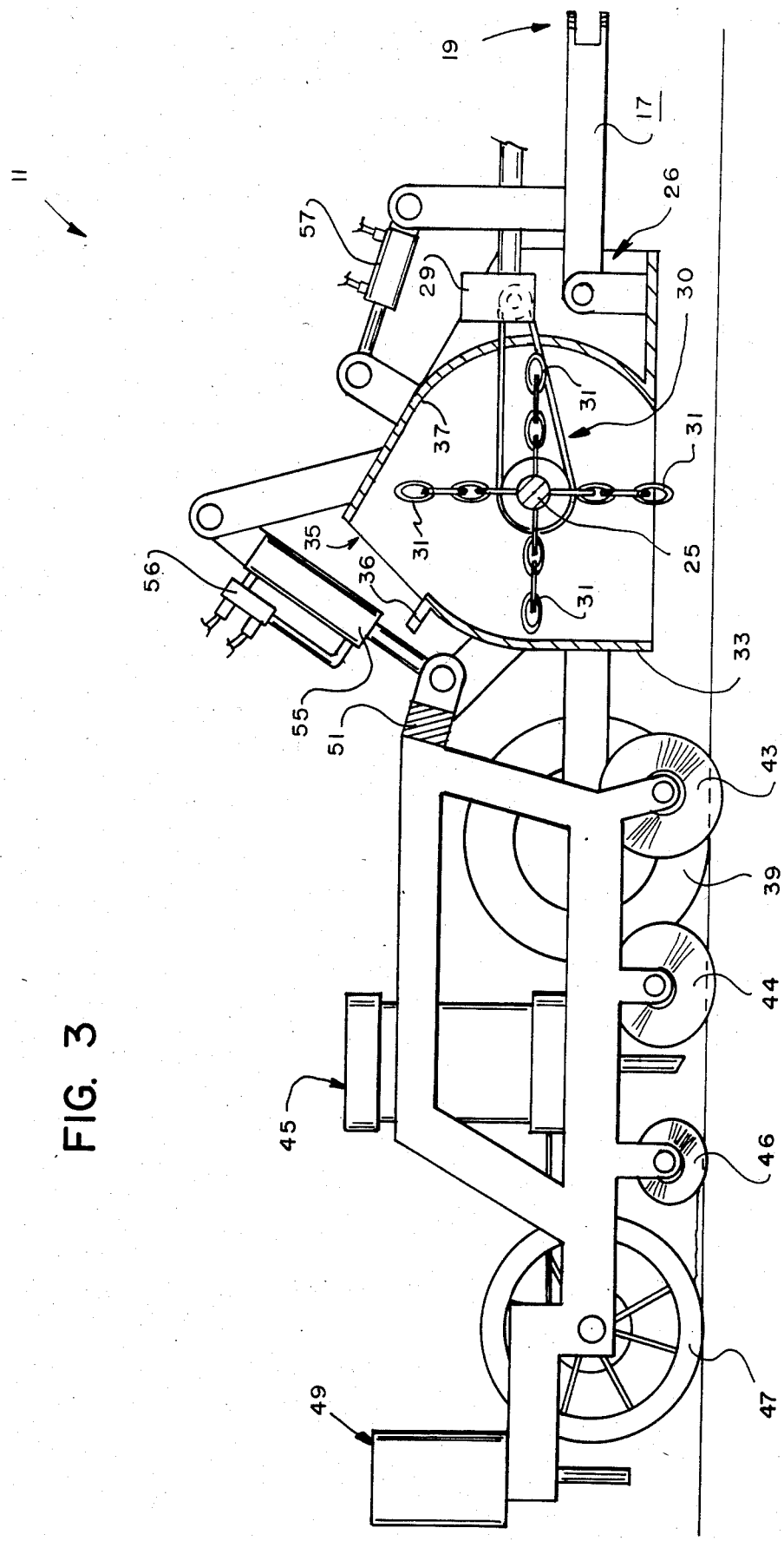
FIG. 3 is a sectional view substantially as taken on line III—III of FIG. 2 with portions thereof removed for clarity.
Figure 4:
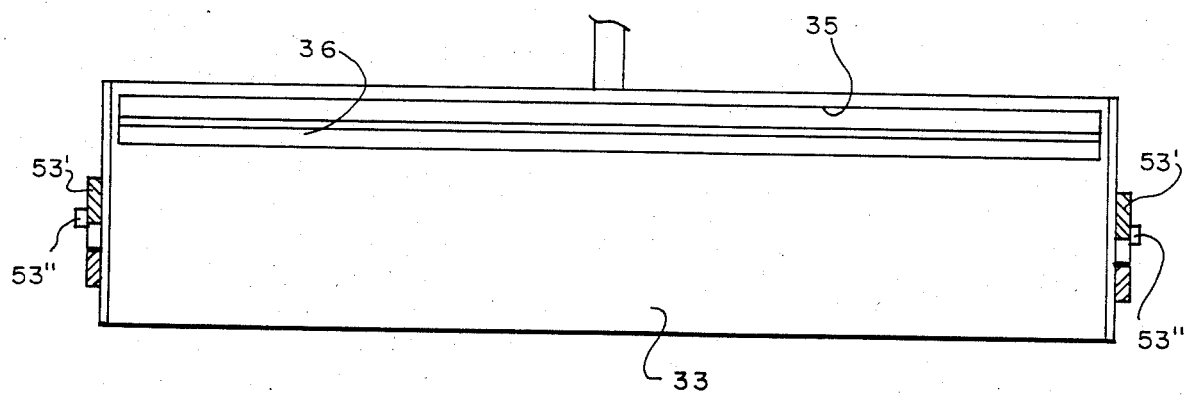
FIG. 4 is a sectional view substantially as taken on line IV—IV of FIG. 1 with portions thereof removed for clarity.

The planting means 23 preferably includes a plurality of planter units 41 arranged spaced apart from one another substantially transversely of the direction of travel of the tractor 13 over the field for planting a plurality of rows of the second crop as the planter 11 is pulled over the field. Each planter unit 41 may be of substantially typical construction including a cutting disc or coulter 43 for cutting a slit through the first crop stubble and into the field, a double disc opener means 44 for opening the slit cut by the coulter 43, seed dispensing means 45 accommodated by the double disc opener means 44 for dispensing seeds for the second crop into the slit cut by the coulter 43 as the slit is opened by the double disc opener means 44, a slit closing means 46 such as a disc cover or slide or ground engaging roller for closing the slit after the seeds have been dispensed thereinto by the seed dispensing means 45, ground firming roller means 47 for passing over and closing the slit cut into the ground by the coulter 43 after the seed has been deposited therein, and chemical dispensing means for dispensing and applying an additive such as herbicide, fertilizer and/or insecticide to the ground after the seed has been deposited therein and the slit closed. It should be noted that the herbicide, fertilizer and/or insecticide may be either fluid or granular and may be stored in dispensing container or tank located on the tractor 13 and coupled to the planting means 23 by hoses or the like, or located directly on the planting means 23 as shown in FIGS. 1 and 3, etc.

An elongated tool bar member 51 is preferably arranged substantially transversely of the direction of travel of the planter 11 over the field and hingeably attached to the rear of the cutting means 21 by a pair of hinge means 53 or the like. More specifically, each hinge means 53 preferably includes a strap-like member 53' having a first end fixedly attached to the tool bar member 51 and having a second end pivotally attached to a side plate of the hood member 33 of the cutting means 21 by a bolt assembly 53". Each planting unit 41 of the planting means 23 is preferably fixedly attached to the bar member 51 by being bolted thereto or the like. Thus, the planting means 23 may consist substantially of a plurality of typical planting units such as the model 386 manufactured by International Harvester Co., Chicago, Ill., attached to the tool bar member 51 in a spaced-apart relation as clearly shown in FIG. 2 for planting a plurality of parallel rows of the second crop. As will be appreciated by those skilled in the art, each planting unit 41 typically includes an open frame for supporting the various components thereof and for being fixedly attached to the tool bar member 51 in any conventional manner now apparent to those skilled in the art such as by way of bolts or the like.

The planter 11 preferably includes a lift means such as a hydraulic cylinder 55 attached between the cutting means 21 and the bar member 51 for causing the bar member 51 to pivot relative to the cutting means 21 so as to raise and lower the planting means 23 relative to the cutting means 21 and the field. Thus, the hydraulic cylinder 55 will cause the bar member 51 and planting means 23 to pivot about the bolt assemblies 53" of the hinge means 53. The hydraulic cylinder 55 is preferably coupled to the typical hydraulic system of the tractor 13 whereby the hydraulic cylinder 55 can be operated from the tractor 13. A spring loaded check valve 56 of any construction well known to those skilled in the art, or the like, is preferably coupled to the hydraulic cylinder 55 to maintain pressure on the planting means 23 and keep it from free floating as will now be apparent to those skilled in the art.

The planter 11 preferably includes a lift means such as a hydraulic cylinder 57 attached relative to the shaft member 25 of the cutting means 21 and the drawbar 15 for allowing the shaft member 25 to be adjusted relative to the ground so as to raise and lower the effective cutting height of the cutting means 21 relative to the field to thereby control the height (cutting depth) of the cutting means 21 as will now be apparent to those skilled in the art. Thus, the hydraulic cylinder 57 will cause the cutting means 21 (and planting means 23) to pivot about the pivot rod/ear assembly 26. The hydraulic cylinder 57 is preferably coupled to the hydraulic system of the tractor 13 whereby the hydraulic cylinder 57 may be activated from the tractor 13.

The construction and operation of the planter 11 will now be apparent to those skilled in the art. Thus, in general, the cutting means 21 operates in much the same manner as a typical flail-type implement to cut the majority of the first crop. Because of the unique construction of the discharge means, the cut portion of the first crop will be thrown or blown upwardly and rearwardly from the cutting means 21 over the planting means 23. The planting means 23 operates in much the same manner as a typical row type planter to plant the second crop as the cut portion of the first crop is thrown or blown over the planting means 23 by the discharge means of the cutting means 21. The cut portion of the first crop substantially falls to the ground over the just-planted second crop to act as a mulch.

Although the present invention has been described and illustrated with respect to a preferred embodiment thereof and a preferred use therefore, it is not to be so limited since changes and modifications can be made therein which are within the full intended scope of the invention.

I claim:

1. A planter for planting a second crop in a field having a first crop thereon, said planter comprising:

(a) cutting means for cutting and removing the majority of the first crop from the field; and (b) planting means located behind said cutting means for planting the second crop after said cutting means cuts and removes the majority of the first crop from the field; said cutting means including discharge means for directing the cut portion of the first crop upward and over said planting means and for allowing the second crop to be planted with the majority of the first crop removed from the field and to subsequently allow the cut portion of the first crop to fall onto the field over the planted second crop to act as a mulch; said cutting means including an elongated shaft member arranged substantially transversely of the direction of travel of said planter over the field, drive means for rotatably driving said shaft member, a plurality of cutting blade members attached to said shaft member and for cutting the majority of the first crop as said planter is moved thereover, and a hood member for covering said shaft member and said cutting blade members, said hood member having an elongated discharge opening therethrough extending substantially the entire length of said shaft member and located generally at the upper rear of said hood member, said hood member having an inner face surface for coacting with said cutting blade members to cut the majority of the first crop as said planter is moved thereover and to cause the cut portion of the first crop to be discharged from said hood member through said discharge opening, said discharge opening and said inner face surface coacting to define said discharge means; said planting means including a plurality of planter units arranged apart from one another substantially transversely of the direction of travel of said planter over the field for planting a plurality of rows of the second crop as said planter is moved over the field; each of said planter units including a disc for cutting a slit into the field, double disc opener means for opening the slit cut by said disc, a seed dispensing means for dispensing seeds for the second crop into the slit cut into the field by said disc, slit closing means for closing the slit after the seeds have been dispsed thereinto, ground firming roller means for closing the slit after the seeds have been dispensed thereinto, and a chemical dispensing means for dispensing chemical after the seeds have been dispensed.

* * * * *